United States Patent
Cugini et al.

(10) Patent No.: US 8,576,720 B2
(45) Date of Patent: Nov. 5, 2013

(54) GLOBAL PROVISIONING OF ZERO-BANDWIDTH TRAFFIC ENGINEERING LABEL SWITCHED PATHS

(75) Inventors: Filippo Cugini, Fidenza (IT); Annikki Welin, Solna (SE); Luca Valcarenghi, Vercelli (IT); Piero Castoldi, Parma (IT); Francesco Paolucci, Pisa (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 148 days.

(21) Appl. No.: 13/254,871

(22) PCT Filed: May 14, 2009

(86) PCT No.: PCT/SE2009/050545
§ 371 (c)(1),
(2), (4) Date: Sep. 6, 2011

(87) PCT Pub. No.: WO2010/104434
PCT Pub. Date: Sep. 16, 2010

(65) Prior Publication Data
US 2012/0002550 A1     Jan. 5, 2012

Related U.S. Application Data

(60) Provisional application No. 61/159,537, filed on Mar. 12, 2009.

(51) Int. Cl.
*H04W 4/00* (2009.01)
*H04J 3/16* (2006.01)
*H04J 3/22* (2006.01)

(52) U.S. Cl.
USPC ............................... 370/238; 370/468

(58) Field of Classification Search
USPC .................................. 370/235, 238, 465, 468
See application file for complete search history.

(56) References Cited

U.S. PATENT DOCUMENTS

| | | | |
|---|---|---|---|
| 6,904,017 | B1 | 6/2005 | Meempat et al. |
| 2006/0067217 | A1 | 3/2006 | Li et al. |
| 2006/0120288 | A1 | 6/2006 | Vasseur et al. |
| 2007/0140114 | A1* | 6/2007 | Mosko ............. 370/229 |
| 2007/0230369 | A1* | 10/2007 | McAlpine ........ 370/256 |
| 2008/0101418 | A1 | 5/2008 | Vasseur |

FOREIGN PATENT DOCUMENTS

WO    WO 04/002078 A1    12/2003

OTHER PUBLICATIONS

Vasseur, A Link-Type sub-TLV to convey the number of Traffic Engineering Label Switched Paths, Sep. 1, 2008, p. 1-10.*

* cited by examiner

*Primary Examiner* — Ronald Abelson

(57) ABSTRACT

A method of load balancing zero-bandwidth Traffic Engineering Label Switching Paths (0-bw TE LSPs) in a communication network having a plurality of network nodes and a plurality of network links connecting the nodes. The method may be implemented in a centralized Path Computation Element (PCE) or in an ingress router. Each equal cost path from a source node to a destination node is identified from network topology information. A probability of selecting each equal cost shortest path is determined using an iterative Global Load balancing Algorithm (GLA) and each 0-bw TE LSP is provisioned with a specific probability such that the 0-bw TE LSPs are uniformly distributed over all network links.

19 Claims, 4 Drawing Sheets

GLOBAL PROVISIONING OF ZERO-BANDWIDTH TRAFFIC ENGINEERING LABEL SWITCHED PATHS

This application is a national stage filing of International Application No. PCT/SE2009/050545, filed May 14, 2009, which claims the benefit of U.S. Provisional Application No. 61/159,537, filed Mar. 12, 2009, the disclosures of which are fully incorporated herein by reference.

TECHNICAL FIELD

The present invention relates generally to communication networks, and in particular, to a method and node in a communication network for provisioning unconstrained Traffic Engineering Label Switched Paths (TE LSPs) signaled with zero bandwidth.

BACKGROUND

In Multi-Protocol Label Switching (MPLS) networks, data transmission occurs on Label-Switched Paths (LSPs). LSPs are a sequence of labels at each and every node along the path from the source to the destination. LSPs are established either prior to data transmission (control-driven) or upon detection of a certain flow of data (data-driven). The labels may be set up through the network by a signaling protocol such as the Label Distribution Protocol (LDP) and the Resource Reservation Protocol-Traffic Engineering (RSVP-TE). Each data packet encapsulates and carries the labels during the packet's journey from source to destination. The paths are set up based on criteria in the Forwarding Equivalence Class (FEC). High-speed switching of data is possible because the fixed-length labels are inserted at the beginning of the packet or cell and can be used by hardware to switch packets quickly between links.

The path begins at a Label Edge Router (LER), which makes a decision on which label to prefix to a packet based on the appropriate FEC. It then forwards the packet to the next router in the path. When a labeled packet is received by an MPLS router, the topmost label is examined. Based on the contents of the label a swap, push (impose), or pop (dispose) operation can be performed on the packet's label stack. Routers can have prebuilt lookup tables that tell them which kind of operation to do based on the topmost label of the incoming packet so they can process the packet very quickly. The last router in the path pops the label from the packet and forwards the packet based on the header of its next layer, for example IPv4. Since the forwarding of packets through an LSP is opaque to higher network layers, an LSP is also sometimes referred to as an MPLS tunnel.

The router which first prefixes the MPLS header to a packet is called an ingress router. The last router in an LSP, which pops the label from the packet, is called an egress router. Routers in between, which need only swap labels, are called transit routers or Label Switching Routers (LSRs). Note that LSPs are unidirectional; they enable a packet to be label switched through the MPLS network from one endpoint to another. Since bidirectional communication is typically desired, the aforementioned dynamic signaling protocols can set up an LSP in the opposite direction to compensate for this.

In deployed MPLS networks, the need for effective recovery mechanisms (for example the MPLS Fast Reroute mechanism) drives the setup of Traffic Engineering Label Switched Paths (TE LSPs) not only for high-class and bandwidth-guaranteed traffic, but also for low-class traffic. Thus, in addition to bandwidth-guaranteed TE LSPs, a typical deployment scenario requires the path computation and provisioning of a full mesh of unconstrained TE LSPs signaled with zero bandwidth (typically referred to as "0-bw TE LSPs") between every LSR of the Routing Area. A 0-bw TE LSP means that the bandwidth reserved for the LSP is zero; the actual traffic load is unknown and may vary dynamically. A more complete description of 0-bw TE LSPs can be gained from J. P. Vasseur, et al., "A Link-Type sub-TLV to Convey the Number of Traffic Engineering Label Switched Paths Signalled with Zero Reserved Bandwidth across a Link", RFC 5330, October 2008, and from U.S. Patent Publication number 2006/0182035 A1.

Since no bandwidth reservation is required for 0-bw TE LSPs, the shortest path computation is performed taking into account just the TE metric (for example, hop count) and without considering bandwidth constraints. Particularly when rerouting 0-bw TE LSPs in symmetrical network topologies with equal cost multi-paths, poor load-balancing of the traffic may result. This, in turn, may cause network congestion and less effective recovery performance.

To solve the problem of global load balancing of 0-bw TE LSPs, RFC 5330 introduced an Open Shortest Path First (OSPF) routing protocol extension called "Unconstrained TE LSP Count TLV" (referred to herein as "UC") with Routing Area flooding scope. UC advertises the number of 0-bw TE LSPs signaled across each link, and enables a tie-breaker policy to be identified between multiple equal cost paths. However, there are also disadvantages to the UC-based solution. First, the required UC advertisement increases the control plane load and may negatively affect network stability, scalability, and convergence time. Second, UC does not guarantee actual load balancing since UC assumes that the traffic carried by all the 0-bw TE LSPs statistically occupies the same amount of bandwidth.

SUMMARY

Accordingly, there is a need for an improved method and node for global provisioning of 0-bw TE LSPs in communications networks. The present invention provides such a method and node.

The present invention utilizes an iterative Global Load balancing Algorithm (GLA), which allows each 0-bw TE LSP to be provisioned with a specific probability such that the full mesh of 0-bw TE LSPs is uniformly distributed over all network links. The computed probability is the probability that a particular path will be selected for provisioning as a 0-bw TE LSP. Only a portion of the network topology is required to establish a full mesh of 0-bw TE LSPs, and the links belonging to the required portion may be identified by configuring them within an Interior Gateway Protocol (IGP) auto mesh.

In exemplary embodiments, the GLA algorithm may be implemented in a centralized Path Computation Element (PCE) or in Ingress Label Switching Routers (LSRs). The GLA algorithm closely approximates a targeted ideal global load balancing without resorting to the aforementioned UC routing protocol extensions.

In one embodiment, the present invention is directed to a method of provisioning zero-bandwidth Traffic Engineering Label Switching Paths (0-bw TE LSPs) in a communication network having a plurality of network nodes and a plurality of network links connecting the nodes. The method includes the steps of identifying from network topology information, each equal cost path from a source node to a destination node; determining a probability of selecting each equal cost shortest path for provisioning as a 0-bw TE LSP; and provisioning each 0-bw TE LSP with a specific probability such that the 0-bw TE LSPs are uniformly distributed over all network links.

In another embodiment, the present invention is directed to a Path Computation Element (PCE) for provisioning 0-bw TE LSPs in a communication network having a plurality of network nodes and a plurality of network links connecting the nodes. The PCE includes a processor for receiving network topology information and for identifying each equal cost path from a source node to a destination node; a memory accessible by the processor for storing program instructions for a load balancing algorithm, wherein the processor runs the program instructions to determine a probability of selecting each equal cost shortest path for provisioning as a 0-bw TE LSP; and a provisioning unit for provisioning each 0-bw TE LSP with a specific probability such that the 0-bw TE LSPs are uniformly distributed over all network links.

In another embodiment, the present invention is directed to an ingress router for provisioning 0-bw TE LSPs in a communication network having a plurality of network nodes and a plurality of network links connecting the nodes. The ingress router includes a Path Computation Client (PCC) for receiving network topology information and for identifying each equal cost path from a source node to a destination node; a memory accessible by the PCC for storing program instructions for a load balancing algorithm, wherein the PCC runs the program instructions to determine a probability of selecting each equal cost shortest path for provisioning as a 0-bw TE LSP; and a routing control processor for provisioning each 0-bw TE LSP with a specific probability such that the 0-bw TE LSPs are uniformly distributed over all network links.

DETAILED DESCRIPTION

Figure 1:
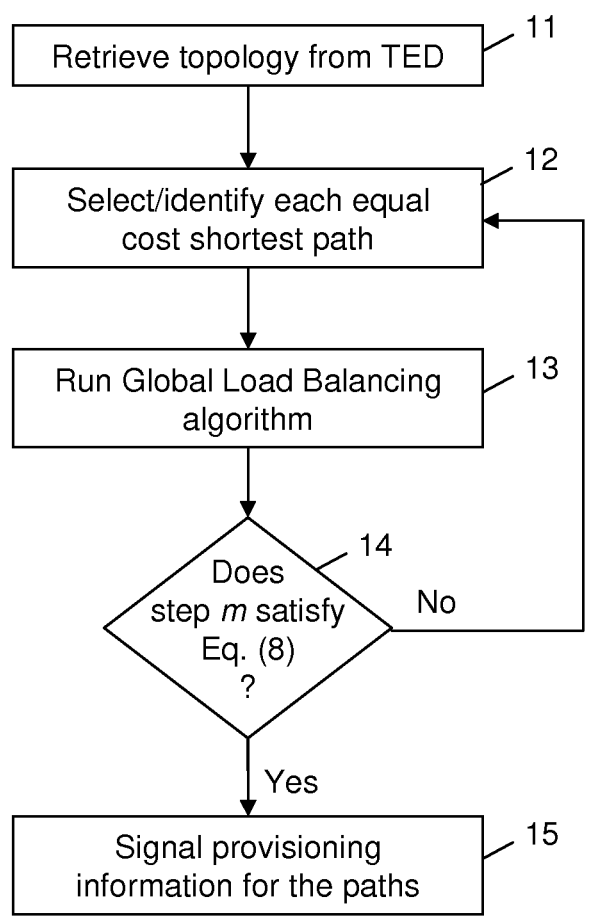
FIG. 1 is a flow chart illustrating the steps of an embodiment of the method of the present invention when the full mesh topology is utilized.

By making statistical assumptions about the aggregated traffic carried onto a set of 0-bw TE LSPs, an algorithm can be designed to load balance (existing or newly configured) 0-bw TE LSPs across a set of equal cost paths. This requires knowledge of the number of 0-bw TE LSPs signaled across a link. The present invention utilizes such an algorithm for global load balancing of 0-bw TE LSPs in communications networks.

In an example scenario, there are three equal cost paths between a source (S) and a destination (D). The three equal cost paths traverse nodes A, B, and C forming paths S-A-D, S-B-D, and S-C-D, respectively. A typical solution is to perform random load balancing. This means that each path has a probability of ⅓ of being selected. When a path is randomly selected, a 0-bw TE LSP is activated along it. In this scenario, a probability of ⅓ is considered because the scenario focuses only on the paths between S and D. The present invention solves the complex problem of adjusting such probabilities between all source and destination LSRs in order to perform global load balancing and avoid the use of the Open Shortest Path First (OSPF) routing protocol extension defined in RFC 5330.

In the detailed description that follows, a network topology G (N, E) is considered, where N is a set of LSRs, and E is a set of links. Each shortest path between a source LSR (s) and a destination LSR (d) is identified by the triple (s,d,j), where $j=(1, \ldots, J_{s,d})$ specifies the path ID. $J_{s,d}$ represents the number of equal cost shortest paths between s and d. $J_{s,d}=1$ in the case of a single shortest path.

The Global Load balancing Algorithm (GLA) exploits the knowledge of (i) the required traffic matrix of 0-bw TE LSPs (for example, the full mesh) and (ii) the network topology retrieved from the Traffic Engineering Database (TED). The GLA algorithm identifies the probability of selecting each equal cost shortest path so that the provisioning of the full mesh of 0-bw TE LSPs is uniformly distributed over all network links.

The GLA algorithm considers a weight $w_k^{(m)}$ for each link $k \in E$, where m represents the algorithm iteration step. A coefficient $r_{s,d,j}^{(m)}$ is computed for each shortest path (s,d,j) from the weights $w_k^{(m)}$ using:

$$r_{s,d,j}^{(m)} = \Sigma_{k \in (s,d,j)} w_k^{(m)}. \quad (1)$$

The computed coefficients $r_{s,d,j}^{(m)}$ are then used to compute the probability $p_{s,d,j}^{(m)}$ of selecting each shortest path j from the set $J_{s,d}$ using:

$$p_{s,d,j}^{(m)} = \frac{r_{s,d,j}^{(m)}}{\sum_{j \in J_{s,d}} r_{s,d,j}^{(m)}}. \quad (2)$$

The computed probabilities are then used as a factor to compute the average number $n_k^{(m)}$ of shortest paths per link using:

$$n_k^{(m)} = \Sigma_{s,d,j | k \in (s,d,j)} p_{s,d,j}^{(m)}. \quad (3)$$

The number $f_k$ of unique shortest paths per link, i.e. where $J_{s,d}=1$ ($f_k \leq n_k^{(m)}$) is then computed using:

$$f_k = \Sigma_{s,d,j | k \in (s,d,j), J_{s,d}=1} p_{s,d,j}^{(m)}. \quad (4)$$

The values of $w_k^{(m)}$ are initialized (i.e., m=0) to $w_k^{(0)}=1 \; \forall k \in E$. Thus the probabilities $p_{s,d,j}^{(0)}$ of each available path $J_{s,d}$ are set to the same value (i.e., $p_{s,d,j}^{(0)}=1/J_{s,d}$).

The average number $\bar{n}$ of shortest paths per link in the entire network G is then computed using:

$$\bar{n} = \frac{\sum_{s,d,j} r_{s,d,j}^{(0)}}{k}. \quad (5)$$

The average number $\bar{n}$ represents the target value of the GLA algorithm for each $n_k^{(m)}$.

At the first iteration step only (i.e., m=1) the weights $w_k^{(1)}$ are computed using:

$$w_k^{(1)} = \frac{\bar{n}}{f_k}. \qquad (6)$$

In this way, the probabilities $p_{s,d,j}^{(m)}$ are modified taking into account single shortest paths where the strict route between s and d is uniquely determined (i.e., $J_{s,d}=1$).

In successive iteration steps (i.e., m>1), the weights $w_k^{(m+1)}$ are computed using:

$$w_k^{(m+1)} = \frac{\bar{n}}{n_k^{(m)}} w_k^{(m)}. \qquad (7)$$

Each iteration step decreases the likelihood of selecting equal cost shortest paths traversing links occupied by a number of paths greater than the average number of paths (i.e., $n_k^{(m)} > \bar{n}$) and increases the likelihood of selecting paths traversing links where $n_k^{(m)} < \bar{n}$.

A stop condition for algorithm iterations is provided by:

$$\max |p_{s,d,j}^{(m)} - p_{s,d,j}^{(m-1)}| \le \epsilon \, \forall s,d,j. \qquad (8)$$

When step m satisfies Eq. (8), then m is the final step $m_f$, where the maximum variations on probabilities $p_{s,d,j}^{(m)}$ from step $m_{f-1}$ are included within a predefined parameter $\epsilon$ (for example, $\epsilon=0.01$).

At each iteration step, the algorithm updates $(\Sigma_{s,d} J_{s,d} + 2k)$ parameters.

The final values $p_{s,d,j}^{(m_f)}$ are then used for provisioning the full mesh of 0-bw TE LSPs between all source-destination pairs.

An exemplary embodiment of the GLA algorithm may be shown with the following pseudo-code:

```
m=0
w_k^(0) = 1 ∀k ∈ E
compute f_k through Eq. (1-4)
compute n̄ through Eq. (5)
m=1
compute w_k^(m) through Eq. (6)
do {
    compute r_{s,d,j}^(m) p_{s,d,j}^(m) n_k^(m) through Eq. (1-3)
    compute w_k^(m+1) through Eq. (7)
    m++;
} while not stop (Eq (8))
return p_{s,d,j}^(m)
```

The following example is provided to illustrate the stopping condition of Equation 8. Assume $\epsilon=0.01$, step m=10, and $p_{(m=10)}=6.10$. At step m=11, $p_{(11)}=6.05$. Thus, $|p_{(11)} - p_{(10)}|=0.05$, which is not less than or equal to $\epsilon=0.01$. Therefore, the stop condition has not been met, and another iteration of the GLA algorithm is performed. At step m=12, $p_{(12)}=6.01$. Thus, $|p_{(12)} - p_{(11)}|=0.04$, which is not less than or equal to $\epsilon=0.01$. Therefore, the stop condition has not been met, and another iteration of the GLA algorithm is performed. At step m=13, $p_{(13)}=6.00$. Thus, $|p_{(13)} - p_{(12)}|=0.01$, which is less than or equal to $\epsilon=0.01$. Therefore, the stop condition has been met and the final probability value $p_{(13)}=6.00$ is utilized.

FIG. 1 is a flow chart illustrating the steps of an embodiment of the method of the present invention when the full mesh topology is utilized. At step 11, the topology is retrieved from the Traffic Engineering Database (TED). At step 12, each multiple equal cost path is selected/identified. At step 13, the GLA algorithm is run, wherein each iteration of the GLA algorithm provides new coefficients $w_k^{(m+1)}$ derived from those calculated at the previous step m, $(w_k^{(m)})$. The difference between $w_k^{(m+1)}$ and $w_k^{(m)}$ decreases at each iteration. As a consequence, the value computed in Equation (8) decreases step by step. At step 14, it is determined whether the latest iteration (step m) satisfies Equation (8) i.e., is the computed difference less than or equal to $\epsilon$. If not, the method returns to step 12 and performs another iteration. When step m satisfies Equation (8), the method moves to step 15 and signals the provisioning information for the paths.

Figure 2:
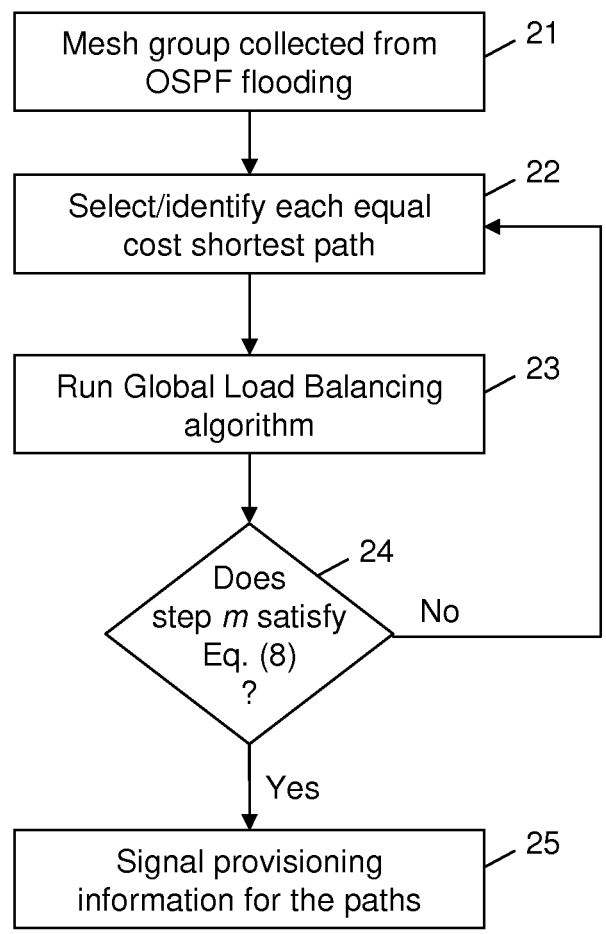
FIG. 2 is a flow chart illustrating the steps of an embodiment of the method of the present invention when only a portion of the topology is utilized.

FIG. 2 is a flow chart illustrating the steps of an embodiment of the method of the present invention when only a portion of the topology is utilized. At step 21, the mesh group to be utilized is collected from Open Shortest Path First (OSPF) flooding. At step 22, each multiple equal cost path is selected/identified. At step 23, the GLA algorithm is run, wherein each iteration of the GLA algorithm provides new coefficients $w_k^{(m+1)}$ derived from those calculated at the previous step m, $(w_k^{(m)})$. The difference between $w_k^{(m+1)}$ and $w_k^{(m)}$ decreases at each iteration. As a consequence, the value computed in Equation (8) decreases step by step. At step 24, it is determined whether the latest iteration (step m) satisfies Equation (8). If not, the method returns to step 22 and performs another iteration. When step m satisfies Equation (8), the method moves to step 25 and signals the provisioning information for the paths.

Figure 3:
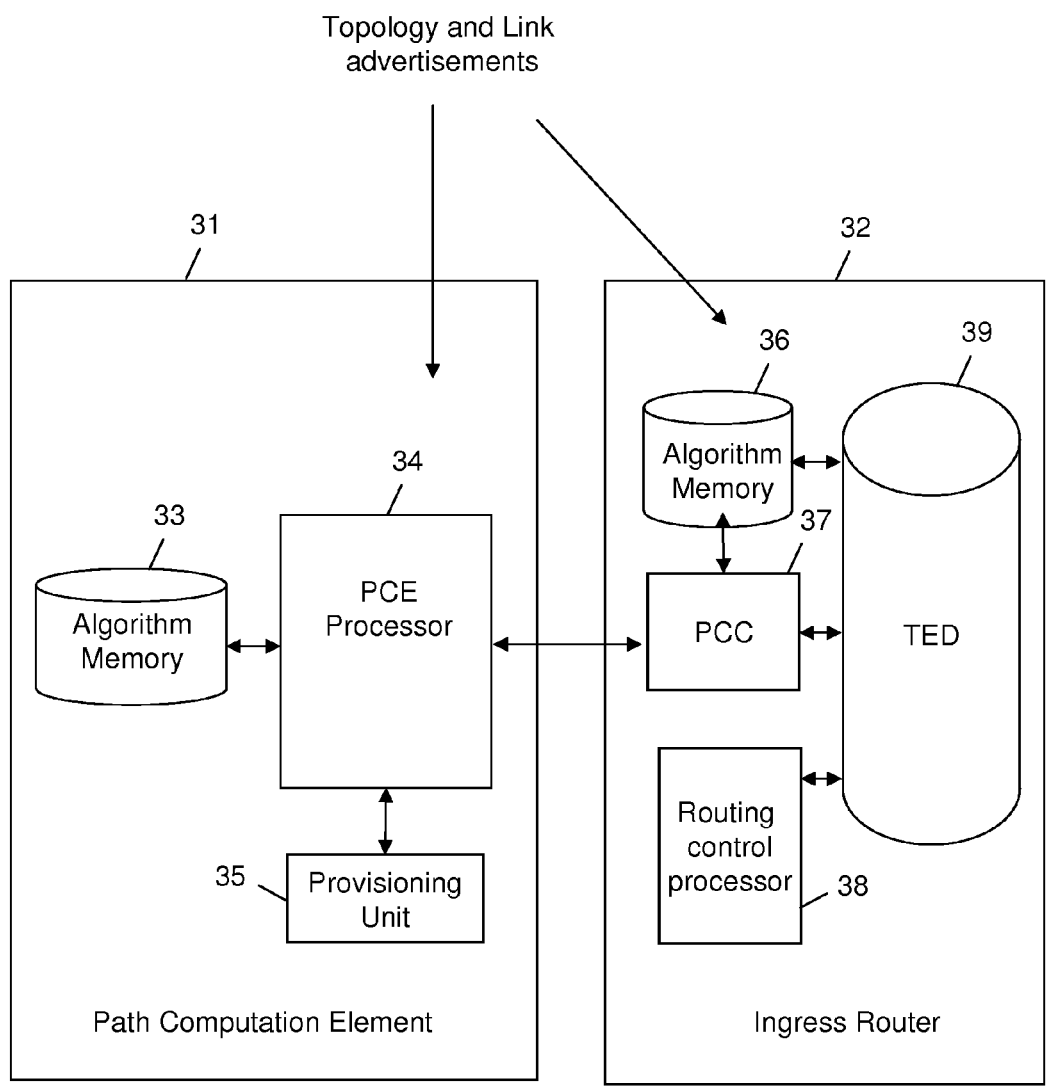
FIG. 3 is a simplified block diagram of a Path Computation Element (PCE) and an Ingress Router in which the system of the present invention may be implemented.

FIG. 3 is a simplified block diagram of a Path Computation Element (PCE) 31 and an Ingress Router 32 in which the system of the present invention may be implemented. The system may be implemented in the PCE, the Ingress Router, or both. Considering first the PCE, which may be a centralized PCE, an algorithm memory 33 stores the program instructions for running the GLA algorithm, including equations (1) through (8). A PCE processor 34 controls the load balancing process and accesses the algorithm memory to retrieve the program instructions for running the GLA algorithm. A provisioning unit 35 provisions each 0-bw TE LSP with a computed probability such that the 0-bw TE LSPs are uniformly distributed over all network links.

The Ingress Router 32 includes a similar algorithm memory 36, a Path Computation Client (PCC) 37, and a routing control processor 38 for controlling the load balancing process and provisioning the 0-bw TE LSPs when the system is implemented solely in the Ingress Router. The components of the Ingress Router access the Traffic Engineering Database (TED) 39 to retrieve the network topology when the full mesh topology is utilized.

Figure 4:
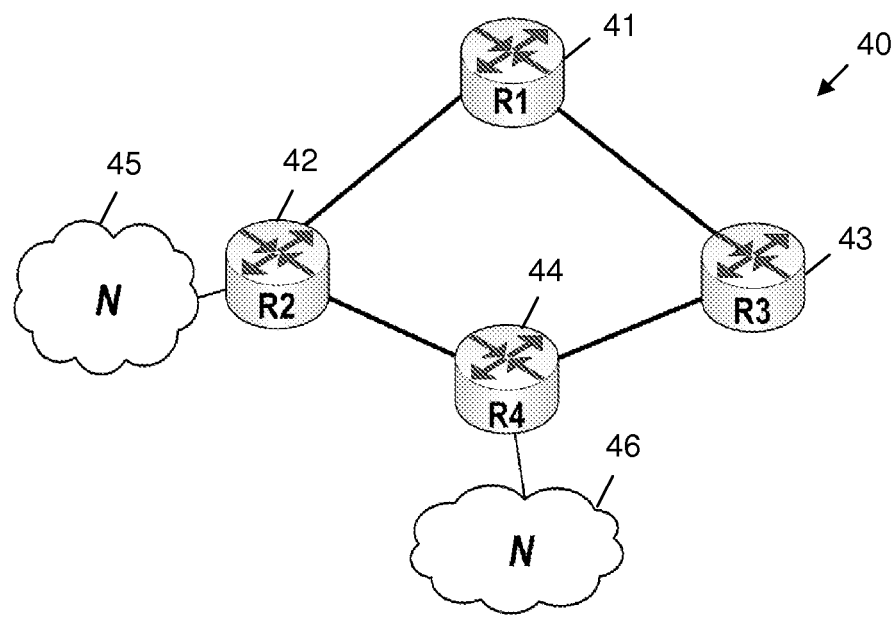
FIG. 4 illustrates a first network Topology A in which the present invention may be utilized for global load balancing of 0-bw TE LSPs when the full mesh topology is utilized.

FIG. 4 illustrates a first network Topology A 40 in which the present invention may be utilized for global load balancing of 0-bw TE LSPs when the full mesh topology is utilized. Topology A includes four Ingress LSRs 41-44 connected to two network clouds 45 and 46 comprising commercially available MPLS routers (Nc=7 LSRs in each cloud). When testing the present invention for Topology A, one hundred load balancing experiments were run. For each experiment, all of the Ingress LSRs 41-44 were configured to compute and provision one 0-bw TE LSP to each of the other LSRs.

Table 1 below shows the number of 0-bw TE LSPs on the four links of the network core for various load balancing scenarios. Four scenarios are compared. In the first scenario (EXP), the averaged values obtained by the aforementioned experimental measurements are reported. In the second scenario, Ideal Local Load (ILL) balancing (i.e., $p_{s,d,j}^{(m)}=1/J_{s,d}$) is applied. Comparison between the first two scenarios confirms that commercially available LSRs tend to achieve ILL balancing by considering all shortest paths having the same probability to be provisioned. In the third scenario, to represent the performance potentially achievable by the utilization of the UC routing protocol extension, Integer Linear Programming (ILP)-based path computation is performed to obtain the Ideal Global Load (IGL) balancing. Results show that, in the considered topology, IGL performs differently from EXP and ILL. Indeed, N additional TE LSPs are routed on link R1-R3 rather than on link R2-R4.

The fourth scenario implements the GLA algorithm of the present invention. The results of three iteration steps are shown: the first, second, and twentieth. At the first iteration step (m=1), the GLA algorithm achieves ILL balancing since all equal cost shortest paths are equally probable (i.e., $p_{s,d,j}^{(m)}=1/J_{s,d}$). At the second iteration step (m=2), the $f_k$ shortest paths are taken into account. Table 1 shows that, already at step m=2, the GLA algorithm well approximates the optimal number of 0-bw TE LSPs on the four core links of the network. The results achieved at the final step ($m_f$=20, $\epsilon$=0.01) closely approximate the values computed by IGL.

TABLE 1

| | | $n_{R1-R2}$, | $n_{R3-R4}$ | $n_{R2-R4}$ | $n_{R1-R3}$ |
|---|---|---|---|---|---|
| EXP | | 16.1 | 15.9 | 72.02 | 8.98 |
| ILL | | 2N = 16 | | $N^2 + N = 72$ | 1 + N = 9 |
| IGL | | 2N = 16 | | $N^2 = 64$ | 1 + 2N = 17 |
| GLA | (m = 1) | 16 | | 72 | 9 |
| | (m = 2) | 16 | | 65.78 | 15.22 |
| | ($m_f$ = 20) | 16 | | 65.15 | 15.85 |

Figure 5:
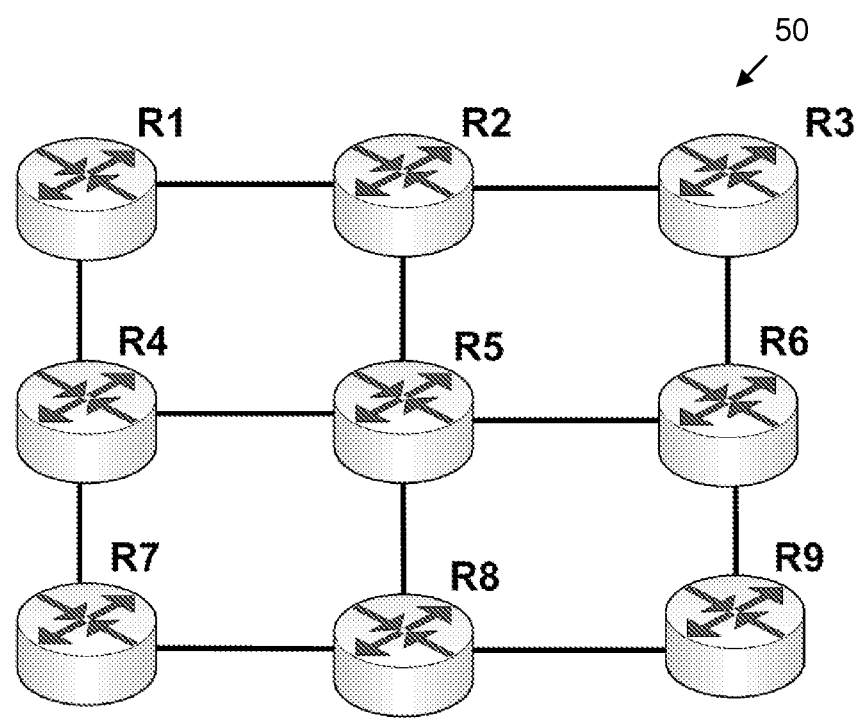
FIG. 5 illustrates a second network Topology B in which the present invention may be utilized for global load balancing of 0-bw TE LSPs when the full mesh topology is utilized.

FIG. 5 illustrates a second network Topology B 50 in which the present invention may be utilized for global load balancing of 0-bw TE LSPs when the full mesh topology is utilized. Due to topology symmetry, only inner and outer links can be considered (inner links are: R2-R5, R4-R5, R5-R6, and R5-R8).

Table 2 below shows the number of 0-bw TE LSPs on the inner and outer links of the network core for various load balancing scenarios. Table 2 shows that ILL balancing and IGL balancing differ in terms of the number of provisioned 0-bw TE LSPs on inner and outer links. In particular, IGL balancing is able to equally distribute the 0-bw TE LSPs on all network links (i.e., inner links and outer links both carry the same amount of 0-bw TE LSPs). At step m=1, the GLA algorithm of the present invention achieves the same results as ILL balancing. Step m=2 does not significantly improve the load balancing performance since, in the considered topology, all links carry the same number of $f_k$ shortest paths. At the final step ($m_f$=15, $\epsilon$=0.01), the GLA algorithm closely approximates the results provided by IGL balancing. Closer approximation is achievable with further iterations. For example, at $m_f$=38 and $\epsilon$=$10^{-5}$, the GLA algorithm achieves the results: $n_i$=6.0003, $n_o$=5.9998). In some circumstances, however, it may be impractical to perform this many iterations since the full mesh of 0-bw TE LSPs is specifically designed to carry an unknown and potentially highly dynamic amount of traffic.

TABLE 2

| | | $n_i$ (inner) | $n_o$ (outer) |
|---|---|---|---|
| EXP | | 7.01 | 5.49 |
| ILL | | 7.33 | 5.33 |
| IGL | | 6 | 6 |
| GLA | (m = 1) | 7.33 | 5.33 |
| | (m = 2) | 6.96 | 5.52 |
| | ($m_f$ = 15) | 6.04 | 5.97 |

As has been illustrated, the GLA algorithm closely approximates Ideal Global Load (IGL) balancing without resorting to undesirable UC routing protocol extensions. The GLA algorithm may be implemented in a centralized PCE or in Ingress LSRs.

The present invention may of course, be carried out in other specific ways than those herein set forth without departing from the essential characteristics of the invention. The present embodiments are, therefore, to be considered in all respects as illustrative and not restrictive and all changes coming within the meaning and equivalency range of the appended claims are intended to be embraced therein.

The invention claimed is:

1. A method of provisioning zero-bandwidth Traffic Engineering Label Switching Paths, 0-bw TE LSPs, in a communication network having a plurality of network nodes and a plurality of network links connecting the nodes, said method comprising the steps of:
    identifying from network topology information, each equal cost path from a source node to a destination node;
    determining a probability of selecting each equal cost shortest path for provisioning as a 0-bw TE LSP; and
    provisioning each 0-bw TE LSP with a specific probability such that an equal number of 0-bw TE LSPs are provisioned for each network link over the entire network.

2. The method as recited in claim 1, wherein the communication network is a Multi-Protocol Label Switching-Traffic Engineering, MPLS-TE, network.

3. The method as recited in claim 1, wherein the communication network is a Generalized Multi-Protocol Label Switching, GMPLS, network.

4. The method as recited in claim 1, wherein the identifying step includes retrieving full mesh topology information from a Traffic Engineering Database, TED.

5. The method as recited in claim 1, wherein the identifying step includes collecting partial mesh topology information from Open Shortest Path First, OSPF, flooding.

6. The method as recited in claim 1, wherein the step of determining the probability of selecting each equal cost shortest path includes computing the probabilities utilizing an iterative Global Load balancing Algorithm to calculate coefficients for each equal cost shortest path, wherein each iteration step calculates new coefficients providing a probability closer to a target value resulting in the full mesh of 0-bw TE LSPs being uniformly distributed over all network links.

7. The method as recited in claim 1, wherein the step of computing the probabilities utilizing an iterative Global Load balancing Algorithm includes:
    initially setting a weight $w_k^{(m)}=1$ for each link k$\in$E, where m represents an algorithm iteration step;
    computing a coefficient $r_{s,d,j}^{(m)}$ for each shortest path (s,d,j) from the weights $w_k^{(m)}$;
    computing a probability $p_{s,d,j}^{(m)}$ of selecting each shortest path j from the set $J_{s,d}$ based on the computed coefficients $r_{s,d,j}^{(m)}$;
    computing an average number $n_k^{(m)}$ of shortest paths per link based on the computed probabilities $p_{s,d,j}^{(m)}$;
    computing a number $f_k$ of unique shortest paths per link;
    computing an average number $\bar{n}$ of shortest paths per link in the entire network G;
    in a first iteration step only, computing the weights $w_k^{(1)}$ using:

$$w_k^{(1)} = \frac{\bar{n}}{f_k};$$

and in successive iteration steps, computing the weights $w_k^{(m+1)}$ using:

$$w_k^{(m+1)} = \frac{\bar{n}}{n_k^{(m)}} w_k^{(m)}.$$

8. The method as recited in claim 1, wherein the method is performed in a centralized Path Computation Element.

9. The method as recited in claim 1, wherein the method is performed in an ingress router.

10. A Path Computation Element, PCE, for provisioning zero-bandwidth Traffic Engineering Label Switching Paths, 0-bw TE LSPs, in a communication network having a plurality of network nodes and a plurality of network links connecting the nodes, said PCE comprising:
- a processor for receiving network topology information and for identifying each equal cost path from a source node to a destination node;
- a memory accessible by the processor for storing program instructions for a load balancing algorithm, wherein the processor runs the program instructions to determine a probability of selecting each equal cost shortest path for provisioning as a 0-bw TE LSP; and
- a provisioning unit for provisioning each 0-bw TE LSP with a specific probability such that an equal number of 0-bw TE LSPs are provisioned for each network link over the entire network.

11. The PCE as recited in claim 10, wherein the PCE is implemented in a Multi-Protocol Label Switching-Traffic Engineering, MPLS-TE, network.

12. The PCE as recited in claim 10, wherein the PCE is implemented in a Generalized Multi-Protocol Label Switching, GMPLS, network.

13. The PCE as recited in claim 10, wherein the processor is adapted to retrieve full mesh topology information from a Traffic Engineering Database, TED.

14. The PCE as recited in claim 10, wherein the processor is adapted to collect partial mesh topology information from Open Shortest Path First, OSPF, flooding.

15. An ingress router for provisioning zero-bandwidth Traffic Engineering Label Switching Paths, 0-bw TE LSPs, in a communication network having a plurality of network nodes and a plurality of network links connecting the nodes, said ingress router comprising:
- a Path Computation Client, PCC, for receiving network topology information and for identifying each equal cost path from a source node to a destination node;
- a memory accessible by the PCC for storing program instructions for a load balancing algorithm, wherein the PCC runs the program instructions to determine a probability of selecting each equal cost shortest path for provisioning as a 0-bw TE LSP; and
- a routing control processor for provisioning each 0-bw TE LSP with a specific probability such that an equal number of 0-bw TE LSPs are provisioned for each network link over the entire network.

16. The ingress router as recited in claim 15, wherein the ingress router is implemented in a Multi-Protocol Label Switching-Traffic Engineering, MPLS-TE, network.

17. The ingress router as recited in claim 15, wherein the ingress router is implemented in a Generalized Multi-Protocol Label Switching, GMPLS, network.

18. The ingress router as recited in claim 15, wherein the PCC is adapted to retrieve full mesh topology information from a Traffic Engineering Database, TED.

19. The ingress router as recited in claim 15, wherein the PCC is adapted to collect partial mesh topology information from Open Shortest Path First, OSPF, flooding.

* * * * *